(12) United States Patent
Kouda

(10) Patent No.: US 8,822,871 B2
(45) Date of Patent: Sep. 2, 2014

(54) WIRE ELECTRIC DISCHARGE MACHINE HAVING POSITIONING ACCURACY COMPENSATION FUNCTION

(75) Inventor: Hisanori Kouda, Yamanashi (JP)

(73) Assignee: FANUC Corporation, Yamanashi (JP)

(*) Notice: Subject to any disclaimer, the term of this patent is extended or adjusted under 35 U.S.C. 154(b) by 170 days.

(21) Appl. No.: 13/494,074

(22) Filed: Jun. 12, 2012

(65) Prior Publication Data
US 2013/0043216 A1 Feb. 21, 2013

(30) Foreign Application Priority Data
Aug. 17, 2011 (JP) ................. 2011-178530

(51) Int. Cl.
*B23H 7/06* (2006.01)
*B23H 7/18* (2006.01)
*B23H 7/20* (2006.01)

(52) U.S. Cl.
CPC .......... *B23H 7/065* (2013.01); *B23H 7/18* (2013.01); *B23H 7/20* (2013.01); *G05B 2219/41036* (2013.01); *G05B 2219/45221* (2013.01)
USPC ................ 219/69.12; 219/69.16; 700/162

(58) Field of Classification Search
CPC .......... B23H 7/02; B23H 11/003; B23H 7/20; B23H 2500/20; B23Q 16/005; B23Q 15/22; B23Q 15/20; G05B 2219/41036; G05B 2219/45221
USPC ............... 219/69.12, 69.11, 69.14, 69.13; 700/162
See application file for complete search history.

(56) References Cited

U.S. PATENT DOCUMENTS

| 4,631,382 | A | * | 12/1986 | Fukunaga et al. ...... 219/69.11 |
| 4,885,449 | A | | 12/1989 | Suzuki |
| 5,006,691 | A | | 4/1991 | Nakayama |
| 5,095,635 | A | * | 3/1992 | Iwasaki ................. 33/644 |

FOREIGN PATENT DOCUMENTS

| DE | 4243393 A1 | | 6/1994 |
| JP | 60-062418 A | * | 1/1985 |
| JP | 61100324 A | | 5/1986 |
| JP | 62271633 A | | 11/1987 |
| JP | 63127830 A | | 5/1988 |
| JP | 63174847 A | | 7/1988 |

(Continued)

OTHER PUBLICATIONS

Extended European Search Report issued in Application No. EP 12166409 dated Jun. 12, 2012, 5 pages.

(Continued)

*Primary Examiner* — Geoffrey S Evans
(74) *Attorney, Agent, or Firm* — Lowe Hauptman & Ham, LLP

(57) ABSTRACT

Two contact detection jigs are spaced apart and attached on a table on which a workpiece to be machined by a wire electric discharge machine is placed, and first, under a state serving as a reference, a distance between these two contact detection jigs (a reference distance) is measured by bringing the wire electrode into contact with these contact detection jigs. Subsequently, in a state of actual use, the wire electrode is brought into contact with these contact detection jigs in the same manner, so that a distance between these two contact detection jigs (an actual distance) is measured. Then, based on the difference between the reference distance and the actual distance, the amount of compensation is obtained to compensate an instruction for moving the wire electrode with respect to the table.

8 Claims, 16 Drawing Sheets

(56) References Cited

FOREIGN PATENT DOCUMENTS

| | | | |
|---|---|---|---|
| JP | 3161247 | A | 7/1991 |
| JP | 7068420 | A | 3/1995 |
| JP | 9300289 | A | 11/1997 |
| JP | 11293413 | A | 10/1999 |
| JP | 2010115757 | A | 5/2010 |
| JP | 2010125556 | A | 6/2010 |

OTHER PUBLICATIONS

Notification of Reasons for Refusal issued in JP2011-178530 dated Dec. 4, 2012, 4 pages. (w/English Translation).

* cited by examiner

FIG. 4
(a)
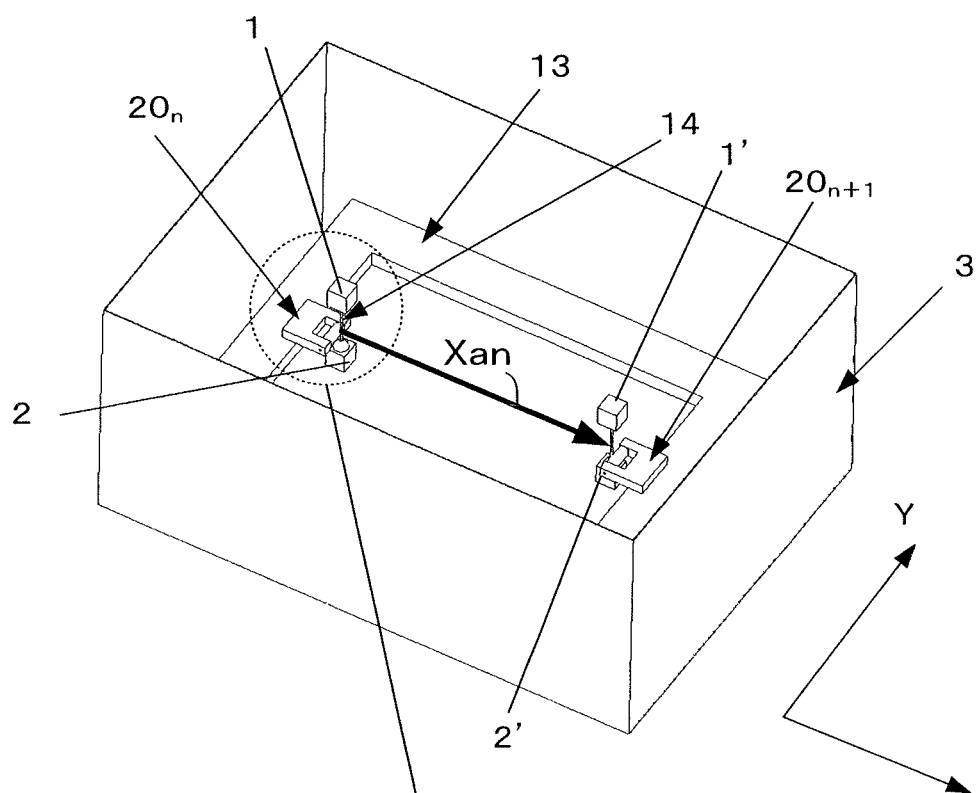
(b)
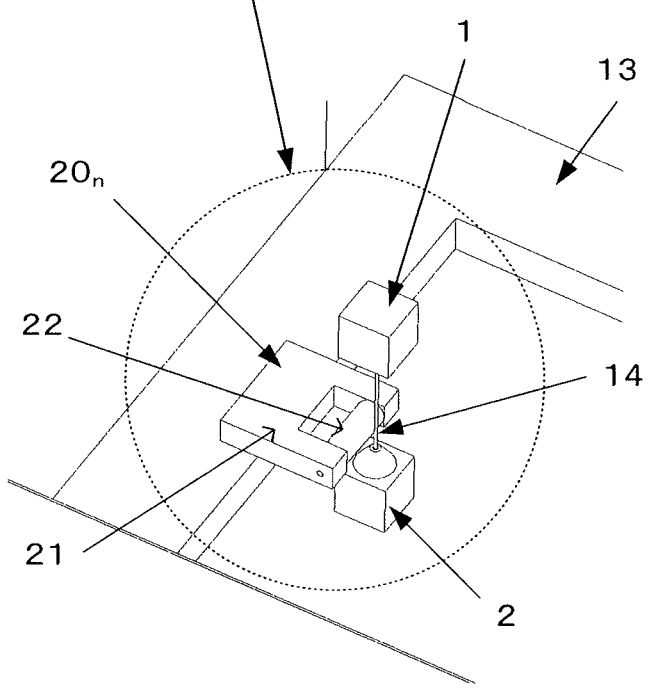

CENTRAL POSITION OBTAINED BY
PERFORMING CALCULATION

FIG. 21
(a)
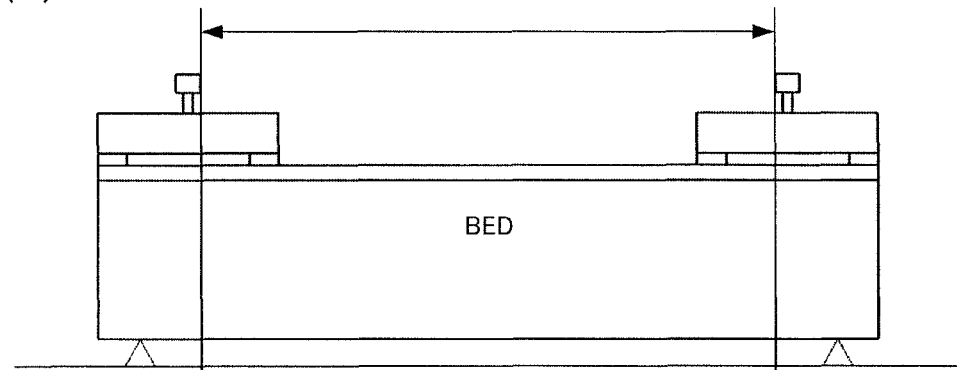
(b)
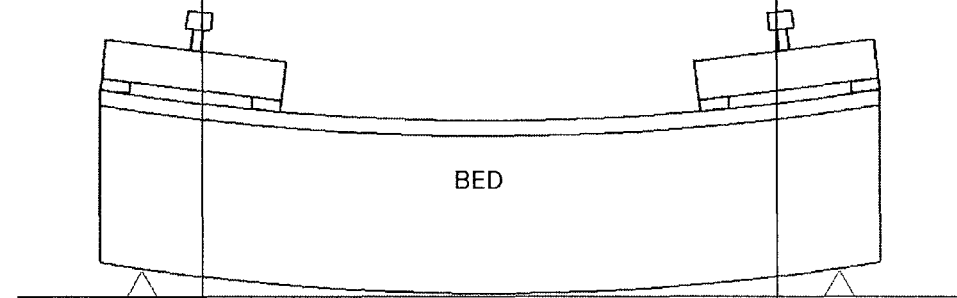
(c)
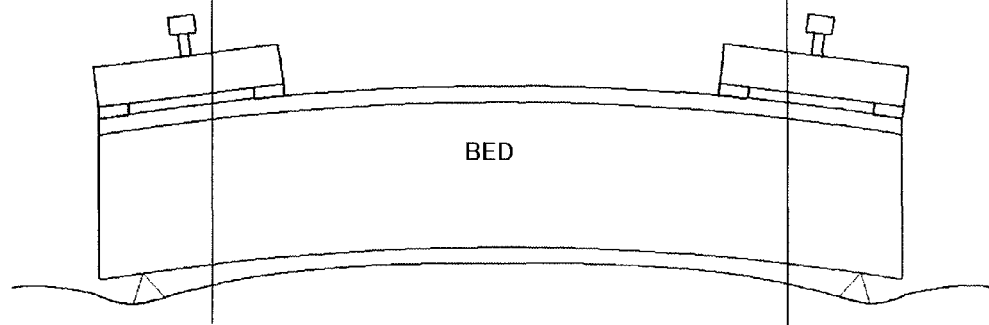

WIRE ELECTRIC DISCHARGE MACHINE HAVING POSITIONING ACCURACY COMPENSATION FUNCTION

RELATED APPLICATIONS

The present application is based on, and claims priority from, Japanese Application Number 2011-178530, filed Aug. 17, 2011, the disclosure of which is hereby incorporated by reference herein in its entirety.

BACKGROUND OF THE INVENTION

1. Field of the Invention

The present invention relates to a wire electric discharge machine having a function of improving positioning accuracy, which is affected and deteriorated by the installation state of the machine, a machining liquid weight, a workpiece weight, and the like.

2. Description of the Related Art

Usually, in an assembly plant, a wire electric discharge machine uses an expensive high-precision measurement device such as a laser interferometer (see Japanese Patent Application Laid-Open No. 62-271633) and a pitch master (see Japanese Patent Application Laid-Open No. 3-161247) to measure the positioning accuracy of each drive axis, and compensates the pitch error.

In FIG. 21, (a) is a figure illustrating a reference state in which the pitch error is compensated in an assembly plant, (b) is a figure illustrating a state in which a bed is bent due to the effects of the machining liquid and the workpiece, and (c) is a figure illustrating a state in which the strength of the floor is weak, and the floor is dented, so that the bed is bent. In the state (b), the central portion of the bed is dented, and a distance between two points is shorter than that in the state (a). In the state (c), both sides of the bed are dented, and a distance between two points is longer than that in the state (a). It should be noted that the bed means a mechanism unit for carrying and holding a table moving mechanism in the wire electric discharge machine. FIG. 22 is a figure illustrating pitch errors in the state (a), (b) and (c) of FIG. 21.

Since expensive high-precision measurement devices such as the laser interferometer and the pitch master cannot be used in machining liquid, the positioning accuracy is measured while the machining liquid is not accumulated in a machining tank in an assembly plant.

However, during actual machining of a workpiece, it is necessary to accumulate the machining liquid to a level equal to or higher than the height of the upper surface of the workpiece, and the machine may be affected by the machining liquid weight and the workpiece weight, and therefore the pitch accuracy of the workpiece may not fit within a reference value. When the machine is shipped from the assembly plant and brought and installed in a user's plant, the amount of deflection of the machine is different due to difference of the strength of the floor and difference of the leveling state of the machine between the assembly plant and the user's plant, and therefore the positioning accuracy may change. Therefore, in an ideal case, after the machine is installed in the user's plant, it is necessary to compensate the pitch error again using a measurement device such as a laser interferometer and a pitch master. However, this requires an expensive measurement device, and the installation and the method for using the measurement device are difficult. Therefore, in reality, it is difficult for the user to measure the positioning accuracy.

SUMMARY OF THE INVENTION

Accordingly, in view of the above problems associated with conventional techniques, it is an object of the present invention is to provide a wire electric discharge machine having a function of improving positioning accuracy, which is affected and deteriorated by the installation state of the machine, a machining liquid weight, a workpiece weight, and the like.

The present invention relates to a wire electric discharge machine having a machining tank for storing a machining liquid, wherein an object to be machined is placed on a table provided in the machining tank, and the object is machined by relatively moving a wire electrode with respect to the table on the basis of an instruction output from a controller. In order to achieve the above object, this wire electric discharge machine includes (1) a combination of contact detection jigs including a first contact detection jig having a first contact detection unit and a second contact detection jig having a second contact detection unit, wherein the first and second contact detection jigs are arranged at a predetermined distance from each other on the table such that the first and second contact detection units face each other, (2) a contact detection unit for detecting contact between the wire electrode and the first and second contact detection jigs, (3) a coordinate value memory unit for respectively storing coordinate values of axes moved when the wire electrode comes into contact with the first and second contact detection jigs, (4) a reference distance memory unit for causing the wire electrode to come into contact with the first and second contact detection jigs under a first state in which a desired positioning accuracy can be obtained, and obtaining and storing, as a reference distance, a distance between the first contact detection jig and the second contact detection jig from the coordinate values when the wire electrode comes into contact with the first and second contact detection jigs, which are stored in the coordinate value memory unit, (5) an actual distance memory unit for causing the wire electrode to come into contact with the first and second contact detection jigs under a second state which is different from the first state, and storing, as an actual distance, a distance between the first contact detection jig and the second contact detection jig from the coordinate values when the wire electrode comes into contact with the first and second contact detection jigs, which are stored in the coordinate value memory unit, and (6) a compensation unit for calculating a difference between the reference distance stored in the reference distance memory unit and the actual distance stored in the actual distance memory unit, and compensating the instruction according to the distance from the contact position coordinate so as to cancel the difference during actual machining.

In the first state, the object may not be placed on the table, and the machining liquid may not be accumulated in the machining tank, and in the second state, the object may be placed on the table, and the machining liquid may be accumulated to a predetermined machining liquid level in the machining tank. The second state may be achieved by accumulating the machining liquid equivalent to a weight of the object placed on the table, in addition to the machining liquid level during the actual machining.

In the first state, the wire electric discharge machine may be installed on a floor with a strength at which a desired positioning accuracy can be obtained, and in the second state, the wire electric discharge machine may be installed on a floor at a location of which strength of a floor is different from that of the first state.

The combination of the contact detection jigs may be a plurality of contact detection jigs installed in each moving direction of the moving axis.

The combination of the contact detection jigs may be a plurality of contact detection jigs arranged in parallel.

The contact detection jig may be made by making a through-hole in a plate-like member, and a coordinate of a center of the hole is obtained by bringing the wire electrode into contact with at least three locations on an inner surface of the through-hole, and the coordinate value may be adopted as a coordinate value of an axis moved when the contact detection jig and the wire electrode come into contact with each other.

The combination of contact detection jigs may be constituted as a single contact detection jig having at least two contact units with the wire electrode.

The present invention can provide the wire electric discharge machine having a function of improving positioning accuracy, which is affected and deteriorated by the installation state of the machine, a machining liquid weight, a workpiece weight, and the like.

BRIEF DESCRIPTION OF THE DRAWINGS

The aforementioned and other objects and features of the present invention will be apparent from the following description of embodiments with reference to the accompanying drawings, in which:

FIGS. 4A and 4B are figures illustrating how a contact position between the contact detection jig and the wire is measured with the same loaded condition as that of the assembly plant;

FIG. 21 is a figure illustrating a reference state (a) in which pitch error is compensated in an assembly plant, a state (b) in which a bed is bent due to the effects of the machining liquid and the workpiece, and a state (c) in which the strength of the floor is weak, and the floor is dented, so that the bed is bent.

DETAILED DESCRIPTION OF THE PREFERRED EMBODIMENTS

Figure 1:
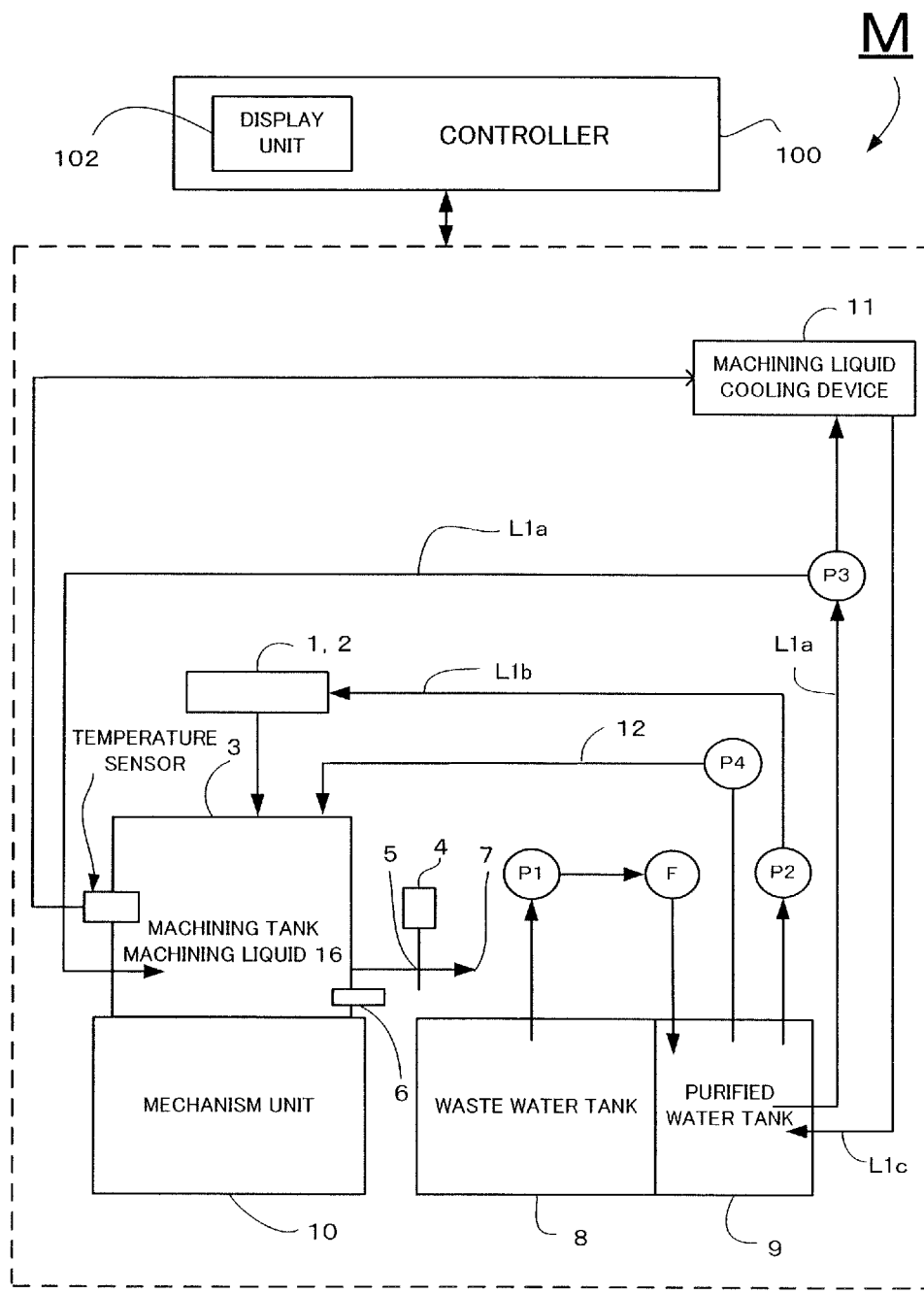
FIG. 1 is a schematic block diagram illustrating an embodiment of a wire electric discharge machine according to the present invention.

An embodiment of a wire electric discharge machine according to the present invention will be explained with reference to a schematic block diagram of FIG. 1.

A workpiece 15 is placed and attached to a table 13 provided on a mechanism unit 10 of the wire electric discharge machine M. Then, a voltage is applied between the workpiece 15 and a wire electrode 14, and the wire electrode 14 is moved relatively with respect to the workpiece 15 while discharge is generated, so that discharge machining is performed on the workpiece 15. When water is rapidly accumulated in the machining tank 3, a machining liquid is supplied and accumulated via a machining liquid supply path 12 for rapid water accumulation. Thereafter, the machining liquid 16 is supplied via the machining liquid supply path L1a. The machining liquid in the machining tank 3 includes machining dusts and the like generated by the discharge machining in a mixed manner, and the machining liquid 16 is configured to flow to a waste water tank 8.

The machining liquid 16 collected and accumulated in the waste water tank 8 is pumped up by a filter pump P1 and is passed through a filter F to be filtered, so that the machining dusts and the like are removed therefrom, and the machining liquid 16 is supplied to a purified water tank 9. The machining liquid 16 accumulated in the purified water tank 9 is pumped up by a circulating pump P3 via a machining liquid supply path L1a. Then, the machining liquid 16 is branched at an outlet port thereof. Some of them is supplied, as makeup water, to the machining tank 3 via the machining liquid supply path L1a, and the other of them is supplied to a machining liquid cooling device 11, so that it is cooled and controlled and returned back to the purified water tank 9 via the machining liquid returning path L1c.

The machining tank 3 is provided with a pressure sensor 6 for measuring the liquid level of the machining liquid in the machining tank 3. Based on a detection signal of the pressure sensor 6, the machining liquid 16 in the machining tank 3 can be maintained at a desired liquid level. Further, water discharge unit is provided in the machining tank 3, and a discharge port 7 is provided so that the machining liquid in the machining tank 3 flows to the waste water tank 8. This water discharge unit includes a discharge port valve 5 and a servo motor 4 for opening and closing the discharge port valve 5. The wire electric discharge machine is controlled by a controller 100 having a display unit 102.

Figure 2:
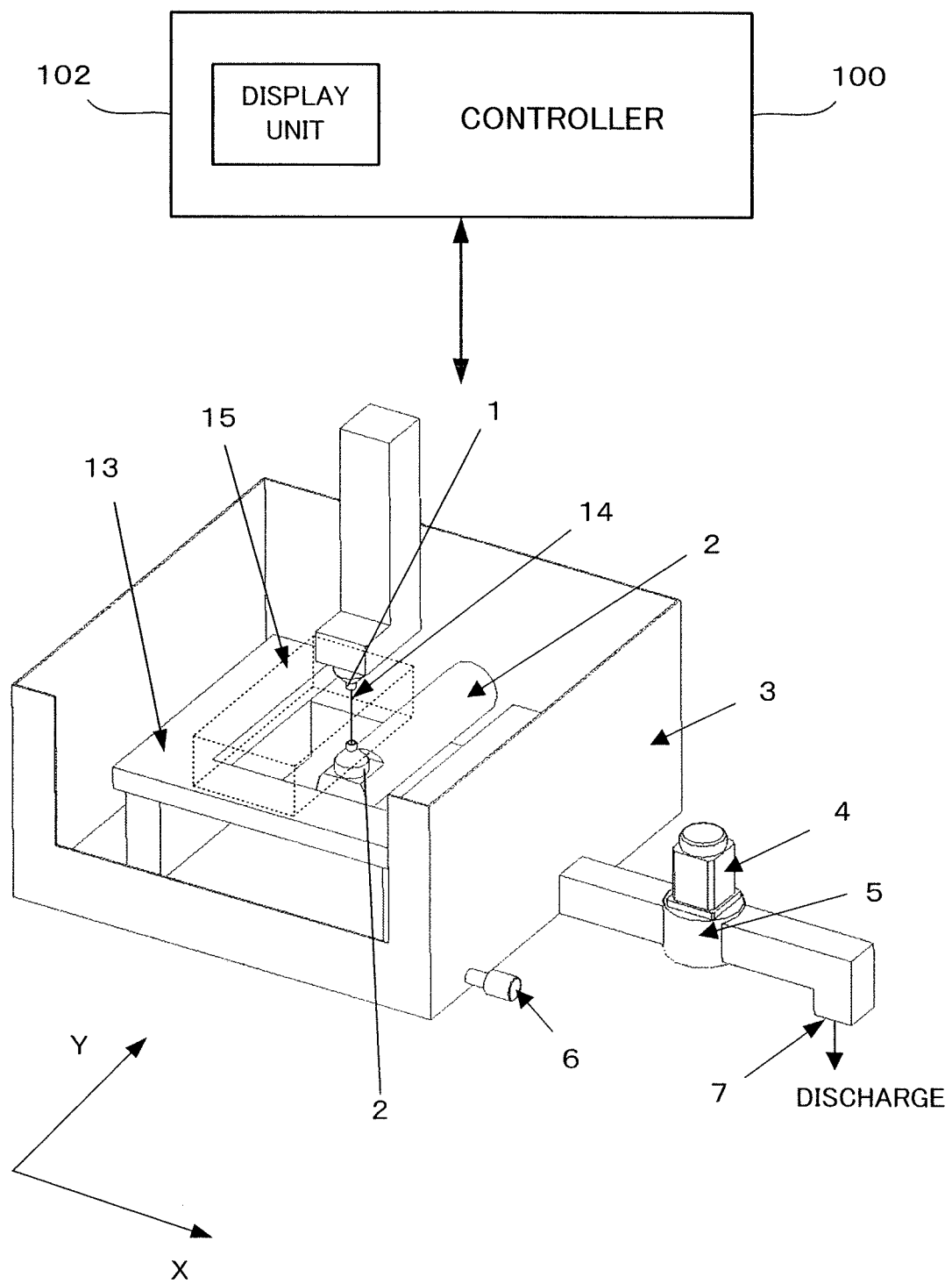
FIG. 2 is an external perspective view illustrating a machining tank of the wire electric discharge machine, with some of the wall surface of the machining tank removed for illustrative purpose.

FIG. 2 is an external perspective view illustrating a machining tank of the wire electric discharge machine, with some of the wall surface of the machining tank removed for illustrative purpose, and in proximity to the machining tank 3, a pressure sensor is used as water level detection means of a water level adjusting system of machining liquid, and a servo motor is used as a water level adjusting mechanism.

The wire electric discharge machine closes a door (not shown) to accumulate the machining liquid 16 in the machining tank 3, and detects water pressure with the pressure sensor 6. The water level in the machining tank 3 can be measured by detecting the water pressure. Then, the degree of opening of the discharge port valve 5 is adjusted by the servo motor 4, whereby the water level is controlled.

During the discharge machining, the object to be machined is machined while the machining liquid is spouting from an upper wire guide 1 and a lower wire guide 2, and accordingly, in usual cases, control is performed with the discharge port valve 5 being opened at a predetermined amount such that the amount equal to the amount flowing into the machining tank 3 is discharged. The discharge port valve 5 has such a structure that a small amount of machining liquid leaks out even when the discharge port valve 5 is completely closed.

Subsequently, error compensation according to the present invention will be explained.

Figure 3:
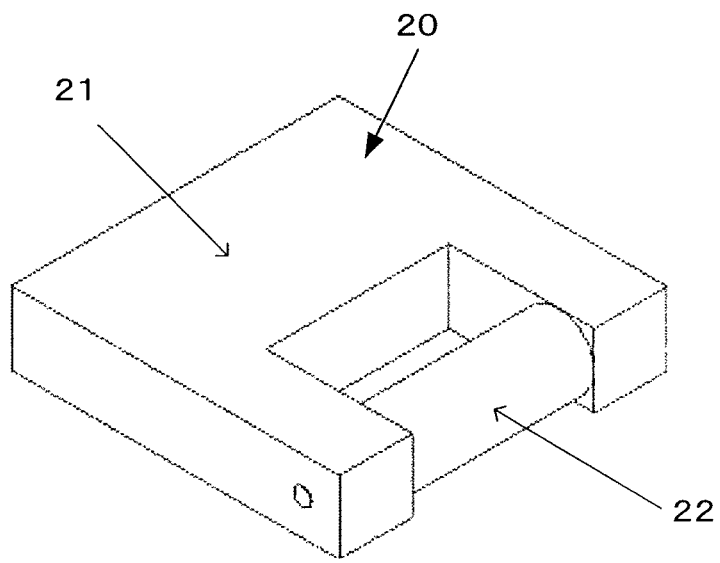
FIG. 3 is an external perspective view illustrating an example of a contact detection jig.

When the positioning accuracy compensation function according to the present invention is carried out, a plurality of contact detection jigs are attached to the table 13 carrying the workpiece 15, and the wire electrode 14 is brought into contact with the contact detection jig, so that using the coordinate of the contact position, the error can be calculated. FIG. 3 is an external perspective view illustrating an example of a contact detection jig.

The contact detection jig 20 includes a wire electrode contact unit 22 and a support member 21 for supporting the wire electrode contact unit 22. The wire electrode contact unit 22 is a member forming a cylindrical shape member having conductivity. For example, the surface of the wire electrode contact unit 22 into which the wire electrode 14 comes into contact is one desirably having a surface roughness Rz 5 μm or less. The support member 21 is formed in a substantially U shape having a recessed portion, and both ends thereof are fixed to the support member 21 so that the cylindrical wire electrode contact unit 22 is arranged in the recessed portion. Due to the cylindrical wire electrode contact unit 22 having conductivity, the wire electrode contact unit 22 and the wire electrode 14 are in point contact, and therefore, the accuracy of contact detection is improved. Since the contact detection jig 20 is attached to the table 13, fixing unit (not shown) is provided on the support member 21. For example, this fixing unit includes a plate-like member for sandwiching the upper surface and the lower surface of the table and bolts for fastening the plate-like member.

Subsequently, a method for compensating error caused by weight change will be explained.

FIG. 4 illustrates how a contact position between the contact detection jig and the wire is measured with the same loaded condition as that of the assembly plant. In this case, 'the same loaded condition as that of the assembly plant' means a state where the machining liquid 16 is accumulated in the machining tank 3 and the workpiece 15 is not placed on the table 13.

Figure 5:
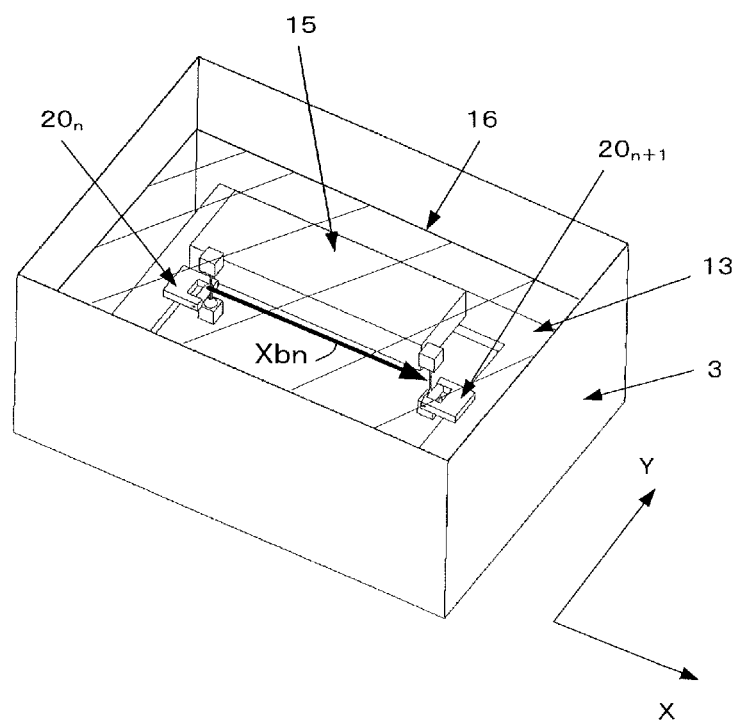
FIG. 5 is a figure illustrating how a contact position between the contact detection jig and the wire is measured when a workpiece is set on the table and the machining liquid is accumulated.

FIG. 5 is a figure illustrating how a contact position between the contact detection jig 20 and the wire electrode 14 is measured when the workpiece 15 is set on the table 13 and the machining liquid 16 is accumulated.

<In Response to Weight Change>

Figure 6:
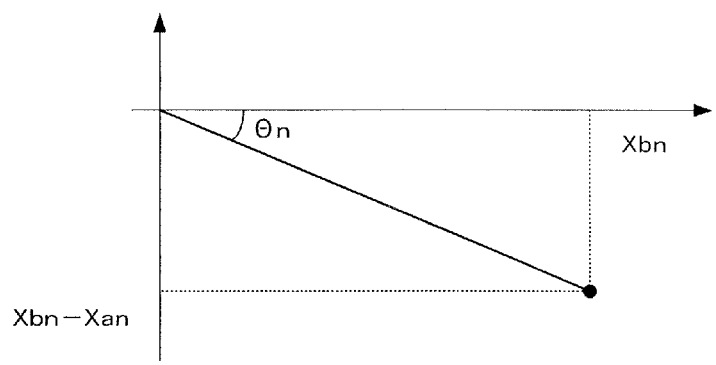
FIG. 6 is a graph illustrating an inclination Θ of the amount of compensation for compensating change of the positioning accuracy.
Figure 7:
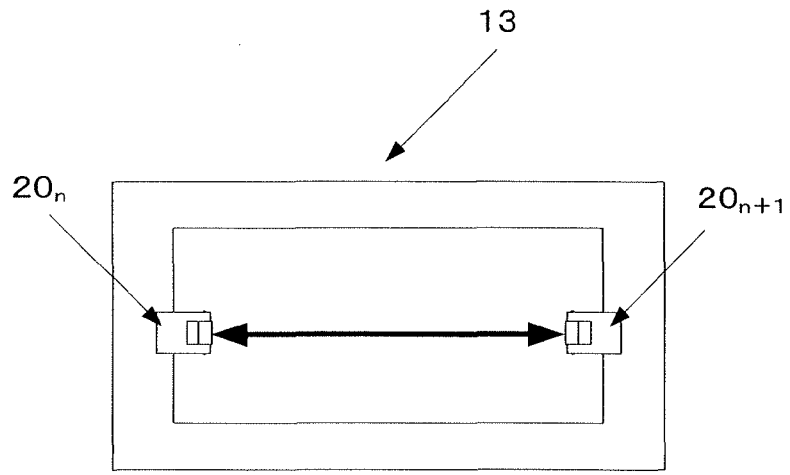
FIG. 7 is a figure illustrating an example where an inter-jig distance is measured in X axis direction.
Figure 8:
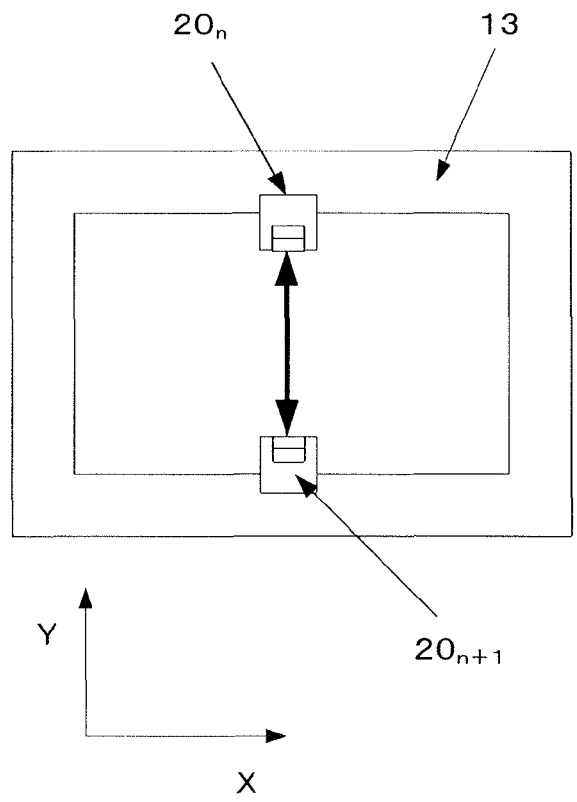
FIG. 8 is a figure illustrating an example where an inter-jig distance is measured in Y axis direction.
Figure 9:
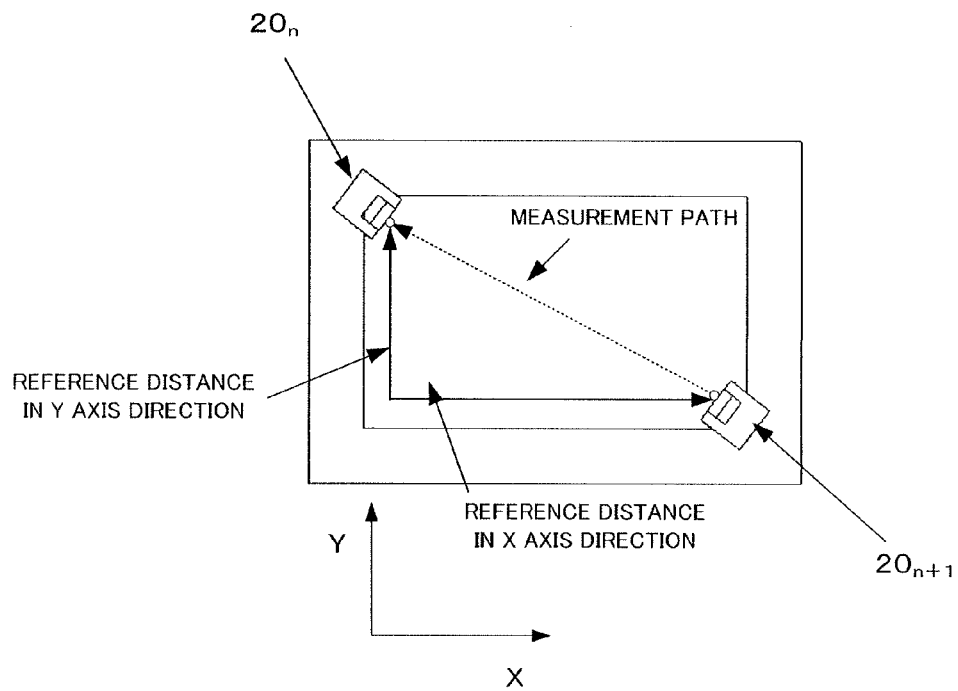
FIG. 9 is a figure illustrating an example where the distance is measured in the X axis direction and the Y axis direction at the same time.

For two or more contact detection jigs 20 provided on the table 13:

(1) by contact detection of the wire electrode 14 in the machine installation state and the loaded condition to the table 13 with which a desired positioning accuracy can be obtained, coordinates $a_n$, $a_{n+1}$ of contact positions of a first contact detection jig $20_n$ and a second contact detection jig $20_{n+1}$, respectively, with the wire electrode 14 are measured and stored, and a distance $Xa_n=a_{n+1}-a_n$ between the contact detection jigs $20_n$, $20_{n+1}$ is obtained. Two or more contact detection jigs may be used. In the example of FIG. 4, two contact detection jigs, i.e., the first contact detection jig $20_n$ and the second contact detection jig $20_{n+1}$, are arranged at a side of the table 13 and a side opposite thereto in the machining tank 3 so that the first contact detection jig $20_n$ and the second contact detection jig $20_{n+1}$ are aligned on the axial line parallel to the X axis. When the wire electrode 14 is relatively moved with respect to the table 13, the coordinates $a_n$, $a_{n+1}$ at the contact positions of the wire electrode 19 can be measured. FIG. 4 illustrates that the upper wire guide 1 and the lower wire guide 2 relatively move to each other to positions of the upper wire guide 1' and the lower wire guide 2' in an arrow direction of 'Xan' with respect to the table 13;

(2) the workpiece 15 is set on the table 13, and the machining liquid 16 is accumulated to the same liquid level as that in the state where the machining tank 3 is actually machined. As shown in FIG. 5, like the above (1), the coordinates $b_n$, $b_{n+1}$ at the contact positions of the contact detection jigs $20_n$, $20_{n+1}$ and the wire electrode 14 are measured and stored, and a distance between the contact detection jigs $Xb_n=b_{n+1}-b_n$ is obtained. Coordinates $b_n$, $b_{n+1}$ at the contact position can be measured by relatively moving the wire electrode 14 or the table 13 with respect to the contact detection jigs $20_n$, $20_{n+1}$; and (3) the inclination $\Theta n$ of the amount of compensation is obtained from the following calculation, $\Theta n=(Xb_n-Xa_n)/Xb_n$. (see FIG. 6);

(4) when the distance from the contact position (coordinate $b_n$) of the wire electrode 14 is denoted as $(Xb_n)'$, the change of the positioning accuracy caused by the weight of the machining liquid 16 in the machining tank 3 and the weight of the workpiece 15 can be compensated by calculating as follows: $(Xb_n)'-\Theta_n*(Xb_n)'$. Making compensation according to the distance from the contact position (coordinate $b_n$) of the wire electrode 14 means making error compensation based on the contact position coordinate system in which the position of the coordinate $b_n$ is the origin point of the coordinate.

It should be noted that "n" in the above (1) to (4) is a natural number equal to or more than 1. A low voltage is applied between the wire electrode 14 and the wire electrode contact unit 22 of the contact detection jig 20 by voltage application unit (not shown). In a circuit formed to include the wire electrode 14 and the wire electrode contact unit 22, whether the wire electrode 14 and the wire electrode contact unit 22 are in contact with each other can be detected by detecting change in the voltage between the wire electrode 14 and the wire electrode contact unit 22 or change in the current flowing through the circuit.

As shown in FIG. 5, when the workpiece 15 is placed at the same position on the table 13 as that for actual machining of the workpiece 15, the effect of unbalanced load caused by the workpiece 15 can also be taken into consideration. When the effect of the unbalanced load caused by the workpiece 15 can be disregarded, the amount of the machining liquid 16 equivalent to the weight of the workpiece 15 may be increased in the machining tank 3, instead of placing the workpiece 15 on the table 13. The amount of the machining liquid 16 in the machining tank 3 can be easily changed as explained with reference to FIGS. 1 and 2. In order to obtain highly accurate positioning accuracy, it is desirable that the position where the contact detection jig 20 should be installed to the table 13 should be a position as close as possible to the position where the machining is executed.

In this case, 'the machine installation state and the loaded condition to the table 13 with which a desired positioning accuracy can be obtained', referred to in the above (1), will be explained. Specific examples of machine installation state and loaded condition to the table 13 with which a desired positioning accuracy can be obtained includes the following states <1> to <3>.

<1> The machine installation state and the loaded condition to the table 13, which are the same as those in the case where the positioning accuracy is measured by means of a laser interferometer or the like to perform the pitch error compensation after the wire electric discharge machine is installed in the user's factory.

<2> The machine installation state and the loaded condition to the table 13, which are the same as those in the course of machining in which a measured value of machining result of the workpiece 15 satisfies the required accuracy.

<3> The machine installation state and the loaded condition to the table 13, which are the same as those in the case where the positioning accuracy is measured in the assembly plant to perform the pitch error compensation when the strength of the floor of the user's factory in which the wire electric discharge machine is installed is equivalent to that of the assembly plant where the wire electric discharge machine is assembled and also when the installation state of the wire electric discharge machine in the assembly plant is reproduced, e.g., the procedure of leveling of the wire electric discharge machine is the same as the procedure in the assembly plant.

Figure 10:
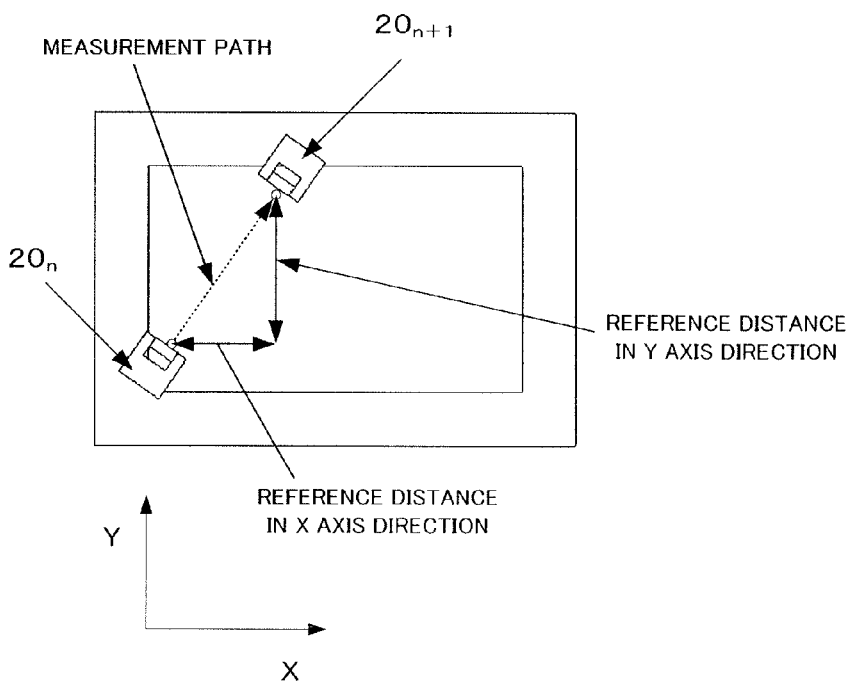
FIG. 10 is a figure illustrating an example where the distance is measured in the X axis direction and the Y axis direction at the same time.
Figure 11:
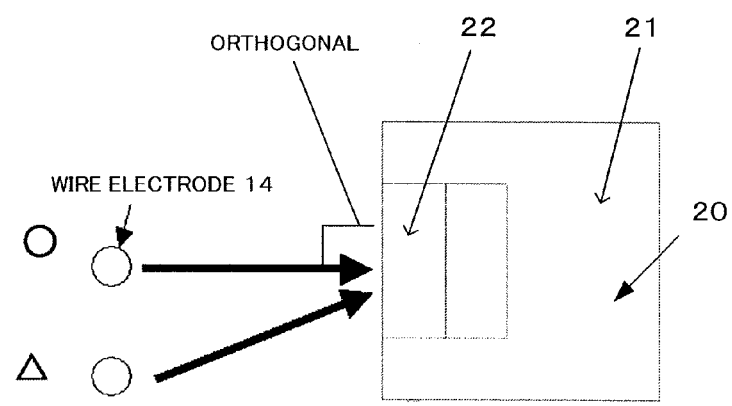
FIG. 11 is a figure illustrating a direction in which the wire comes into contact with the contact detection jig.

By the way, FIG. 4 and FIG. 5 show examples of measurement of the inter-jig distance in the X axis direction with the contact detection jig 20, but as shown in FIGS. 7, 8, 9, and 10, the inter-jig distance in the X axis direction (see FIG. 7), the Y axis direction (see FIG. 8), and the XY axis direction (see FIG. 9) can also be measured at the same time. When the actual machining pitch is shorter than the stroke in the XY axis, the measurement may be performed with a distance shorter than the stroke in the XY axis as shown in FIG. 10. In order to detect the position of the contact detection jig 20 with high accuracy, it is desired to bring the wire electrode 14 into contact with the contact detection jig 20 such that the wire electrode 14 is perpendicular to the contact detection jig 20 as shown in FIG. 11.

Hereinafter, cases other than the contact detection jig 20 having the contact detection unit formed with the conductive member having the cylindrical shape as shown in FIG. 3 and the like will be explained.

Figure 12:
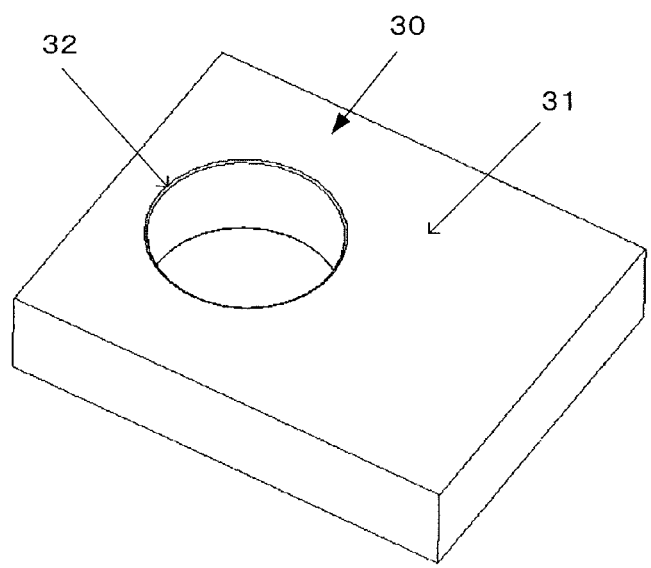
FIG. 12 is a figure illustrating an example of a contact detection jig of which contact detection unit is a round hole.

FIG. 12 is a figure illustrating an example of a contact detection jig of which contact detection unit is a round hole.

A contact detection jig 30 has a plate-like conductive support member 31 provided with a wire electrode contact unit 32 which is a circular through-hole having an appropriate diameter.

Figure 13:
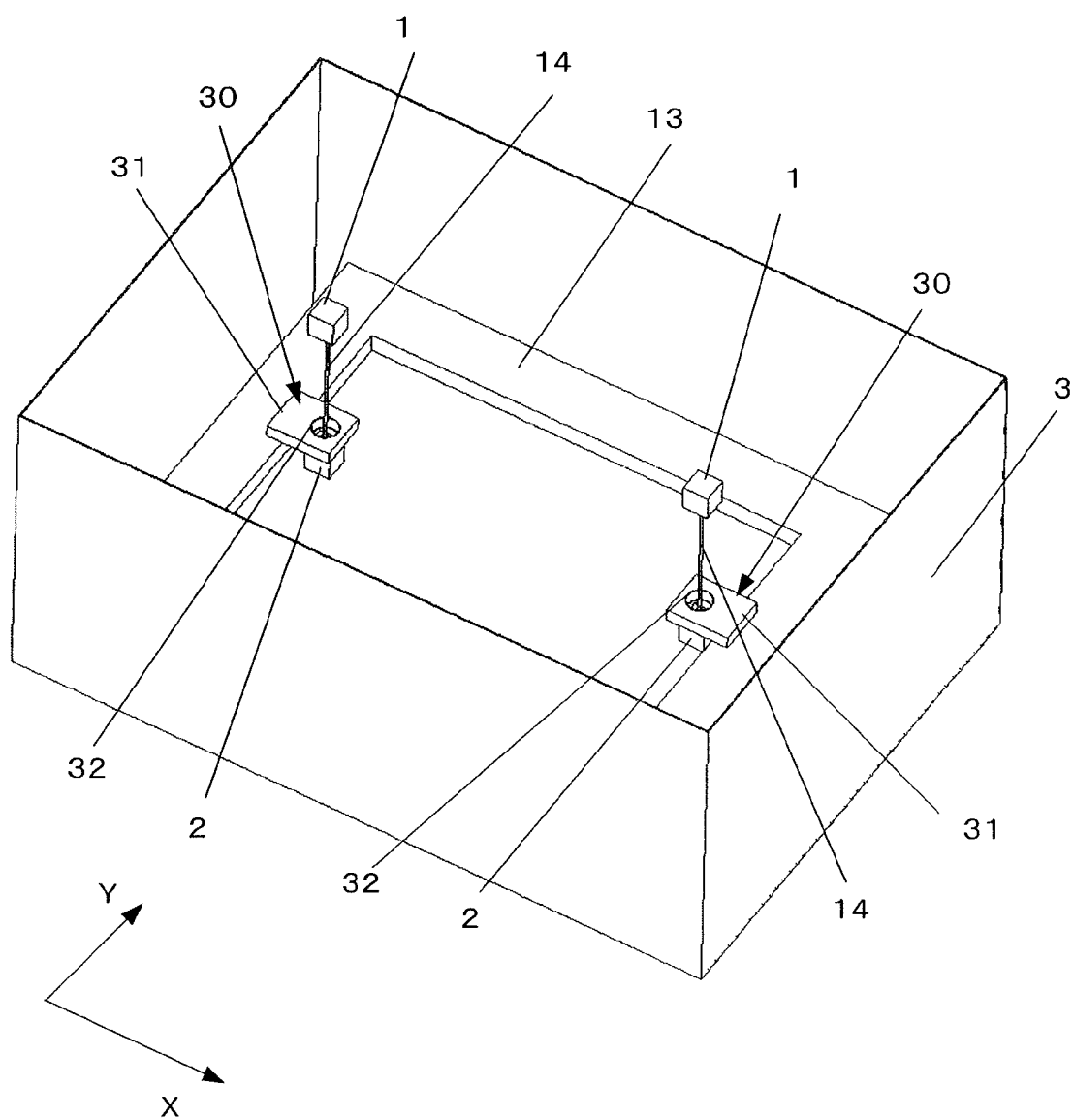
FIG. 13 is a figure illustrating an example of measurement of an inter-jig distance using the contact detection jig of FIG. 12.

FIG. 13 is a figure illustrating an example of measurement of an inter-jig distance using the contact detection jig of FIG. 12.

Two contact detection jigs 30 as shown in FIG. 12 are used, and like FIGS. 4 and 5, these two contact detection jigs 30 are attached on the same axis at two locations of the table 13 in the machining tank 3 so as to face each other. The contact position of the wire electrode contact unit 32 of the contact detection jig 30 and the wire electrode 14 can be measured by relatively moving the wire electrode 14 with respect to the table 13 in the machining tank 3 as in the cases shown in FIGS. 3 and 4. However, in this example, it is required that, after the contact position of the wire electrode contact unit 32 of one of the through-holes is detected, the wire electrode is once disconnected, and the wire electrode contact unit 32 of the other of the through-holes is reconnected, and thereafter, detection of contact position is carried out.

Figure 14:
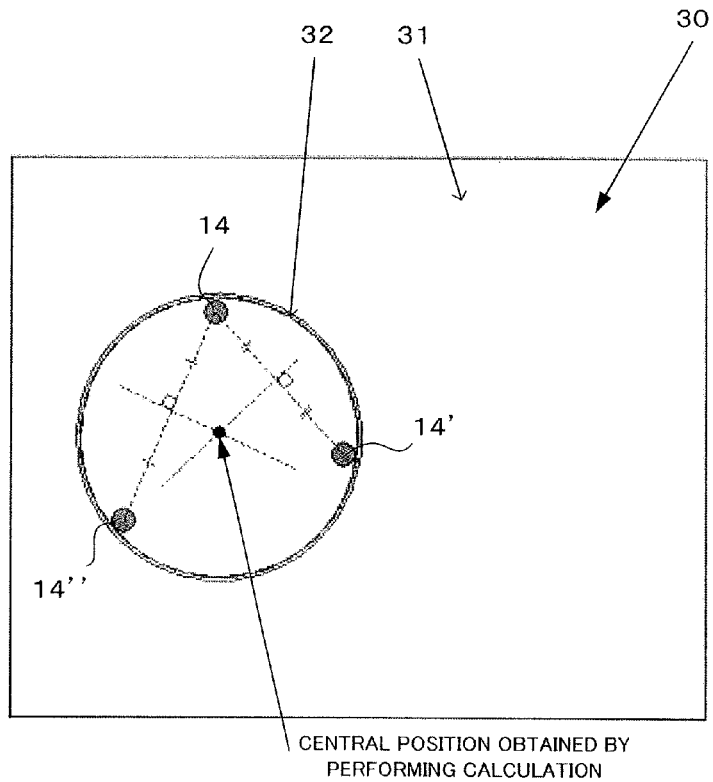
FIG. 14 is a figure illustrating an example of a method for obtaining a hole center position with the contact detection jig of FIG. 12.

The contact position between the wire electrode 14 and the wire electrode contact unit 32 may be at the position of the wall surface of the through-hole on which the wire electrode contact unit 32 is formed, or may be at the central position of the through-hole. FIG. 14 is a figure illustrating an example of a method for obtaining a hole center position by means of the contact detection jig of FIG. 12. The coordinates are measured at any three different wall surface positions of the through-hole in which the wire electrode contact unit 32 is formed. Since the center of the circle is on a perpendicular bisector of any chord on an arc, the center of the through-hole can be obtained by performing calculation from two chords obtained at any three points that do not overlap each other on the arc. For the wire electrode 14, calculation of error evaluation may be performed based on the central position of the through-hole obtained by calculation instead of the wall surface position of the through-hole serving as the wire electrode contact unit 32.

In the above explanation, the contact detection jig 20 as shown in FIG. 3 has one wire electrode contact unit 22 coming into contact with the wire electrode 14, and the contact detection jig 30 as shown in FIG. 12 has one through-hole serving as the wire electrode contact unit 32 coming into contact with the wire electrode 14. Alternatively, two or more wire electrode contact units may be supported by the support member. This case is equivalent to a case where two contact detection jigs are used.

A contact detection jig 40 having wire electrode contact units 42a, 42b respectively attached to two locations of a support member 41 will be explained with reference to FIG. 15.

The two wire electrode contact units 42a, 42b attached to the support member 91 are cylindrical members having conductivity. These wire electrode contact units 42a, 42b are attached to the support member 41 such that the wire electrode contact units 42a, 42b are vertically arranged in parallel to each other on the side surface of the support member 31. When the error compensation is performed, the positions of the two wire electrode contact units 42a and 42b may be measured. Like FIGS. 4 and 5, the contact positions between the wire electrode contact units 42a, 42b and the wire electrode 14 are detected by relatively moving the wire electrode 14 with respect to the table 13.

Figure 16:
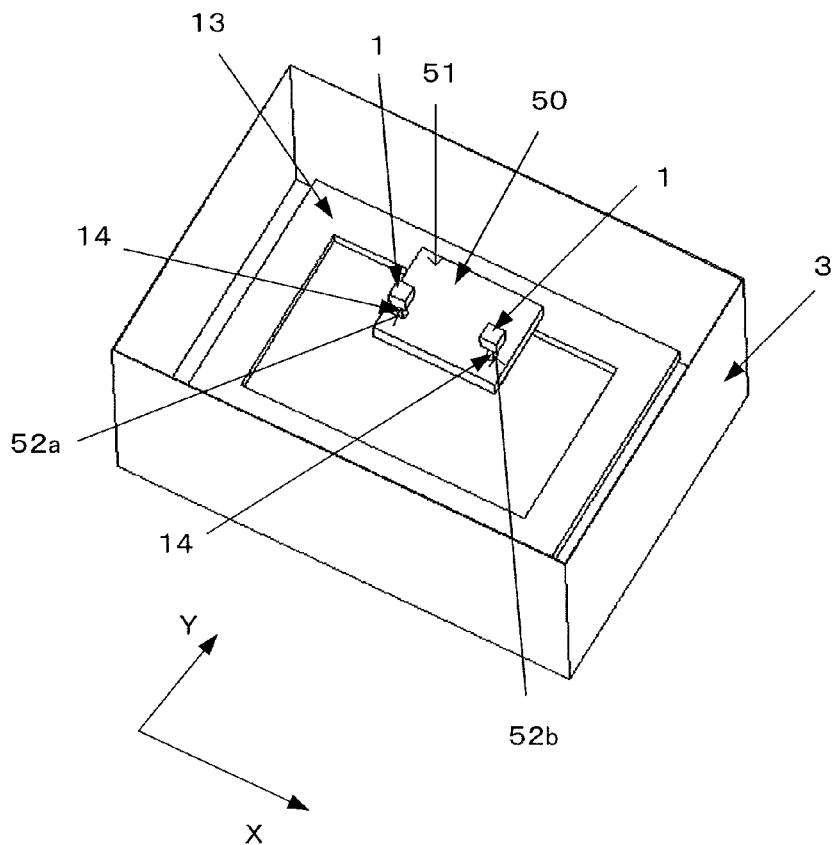
FIG. 16 is a figure illustrating a contact detection jig having holes at two locations of one plate, capable of performing contact detection.

FIG. 16 shows a contact detection jig 50 provided with wire electrode contact units 52a, 52b which are through-holes with which contact detection can be performed with wire electrodes 14 at two locations of a support member 51. Like, e.g., FIGS. 4 and 5, the contact positions between the wire electrode contact units 52a, 52b and the wire electrode 14 are detected by relatively moving the wire electrode 19 with respect to the table 13. However, in this case, like FIG. 13, it is required that, after the contact position of the wire electrode contact unit 52a of one of the through-holes is detected, the wire electrode is once disconnected, and the wire electrode contact unit 52b of the other of the through-holes is reconnected, and thereafter, detection of contact position is carried out.

Figure 15:
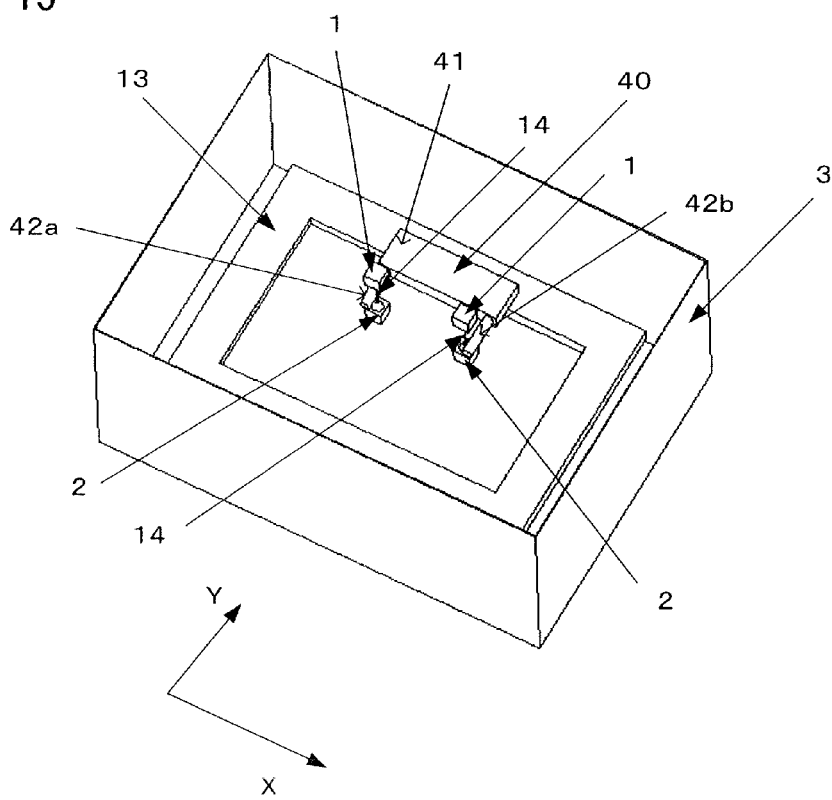
FIG. 15 is a figure for illustrating a contact detection jig respectively having wire electrode contact units at two locations of a support member.

In the above cases of FIGS. 15 and 16, two wire electrode contact units are provided on one support member, and therefore, work performed by a worker for fixing the support member to the table 13 in the machining tank 3 can be reduced. The positioning is easier than using two contact detection jigs.

Figure 17:
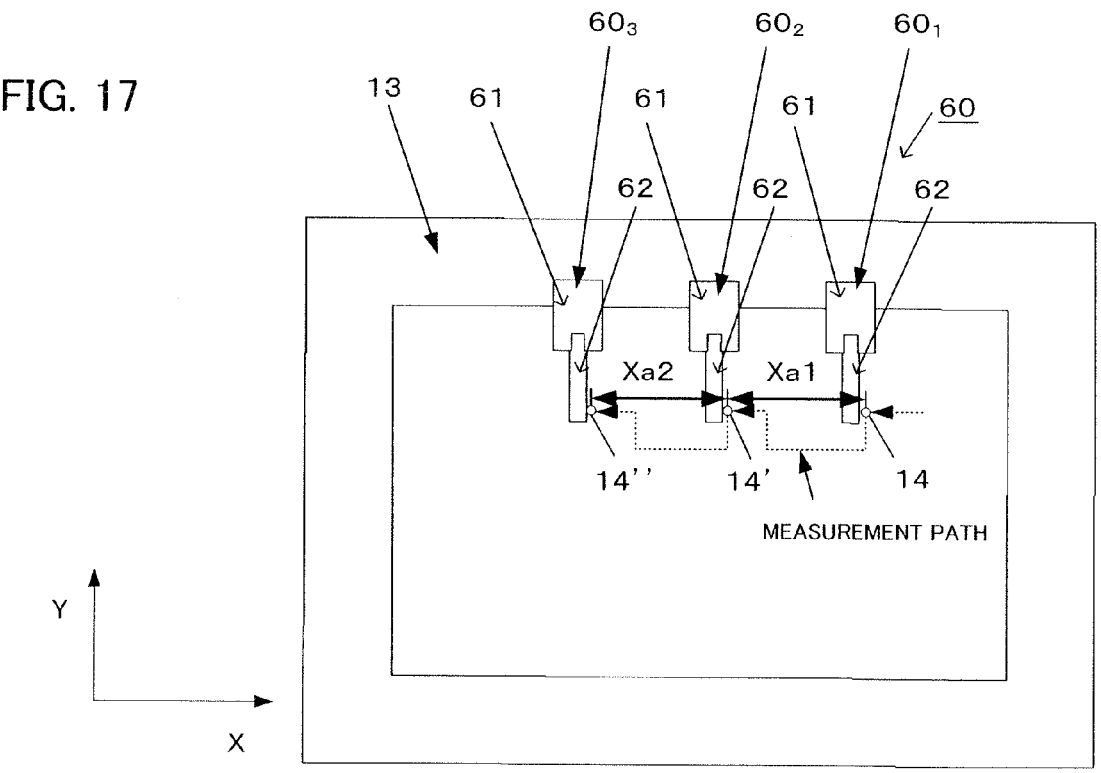
FIG. 17 is a figure illustrating an example where three contact detection jigs are used.

Subsequently, a case where three contact detection jigs are used will be explained. Using many contact detection jigs, an average value can be calculated, which enables the error to be evaluated more accurately. FIG. 17 is a figure illustrating an example where three contact detection jigs are used. Each contact detection jig 60 includes a support member 61 and a wire electrode contact unit 62 vertically arranged on the side surface of the support member 61. The wire electrode contact unit 62 attached to the support member 61 is a cylindrical members having conductivity.

As shown in FIG. 17, the wire electrode 14 relatively moves with respect to the wire electrode contact unit 62 of a contact detection jig $60_1$, the wire electrode contact unit 62 of a contact detection jig $60_2$, and the wire electrode contact unit 62 of a contact detection jig $60_3$. The position when the wire electrode 14 comes into contact with each of the wire electrode contact units 62, 62, 62 is detected.

The weight change of the wire electric discharge machine has been hereinabove explained. Subsequently, change of the situation of installation of the wire electric discharge machine (the strength of the floor) will be explained.

Figure 18:
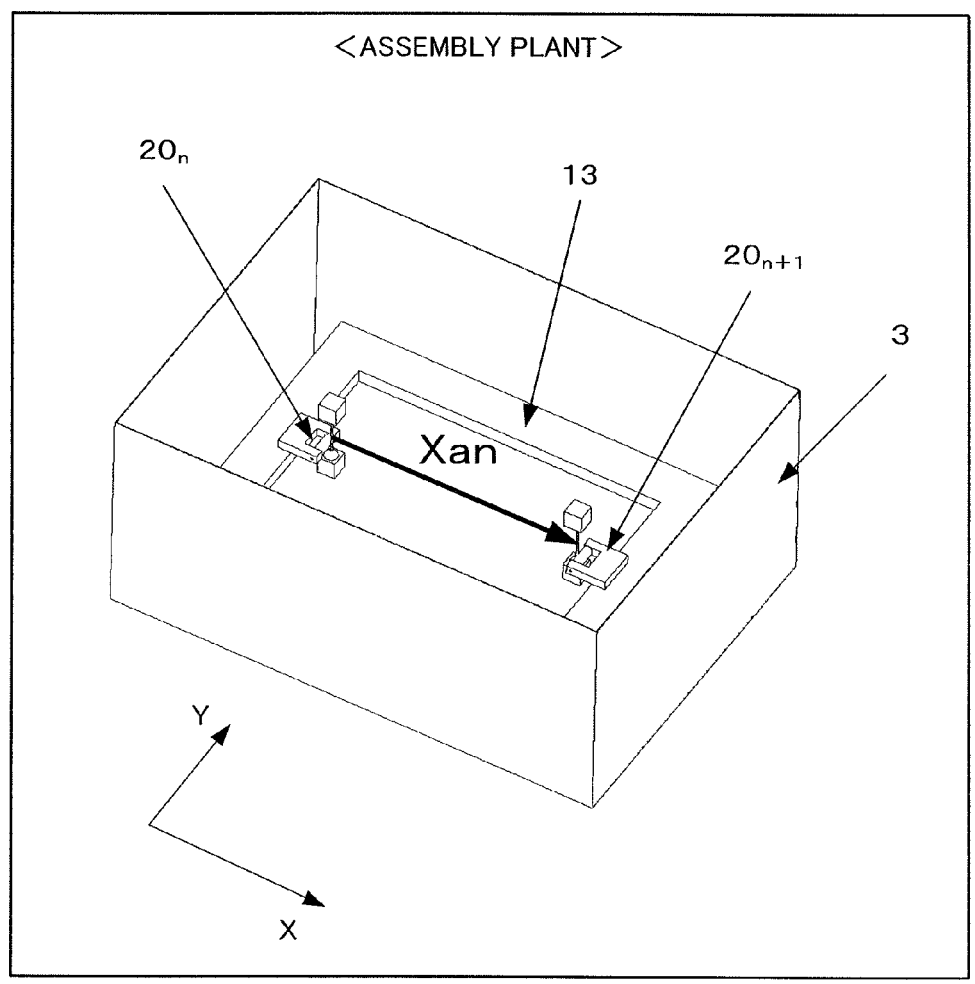
FIG. 18 is a figure illustrating how an inter-jig distance is measured in an assembly plant.

For two or more contact detection jigs 20 provided on the table 13:

[1] according to the contact detection of the wire electrode 14 in the assembly plant of the wire electric discharge machine before the shipment, coordinates $a_n$, $a_{n+1}$ of contact positions of a first contact detection jig $20_n$ and a second contact detection jig $20_{n+1}$, respectively, with the wire electrode 14 are measured and stored, and as shown in FIG. 18, a distance $Xa_n = a_{n+1} - a_n$ between the contact detection jigs $20_n$ and $20_{n+1}$ is obtained. Two or more contact detection jigs may be used. The respective contact detection jigs are arranged on two opposite sides of the table 13 in the machining tank 3 so that the contact detection jigs are aligned on the axial line parallel to the X axis.

In FIG. 18, the contact detection jigs, i.e., the first contact detection jig $20_n$ and the second contact detection jig $20_{n+1}$, are respectively arranged on the two opposite sides of the table 13 in the machining tank 3. Then, coordinates $a_n$, $a_{n+1}$ at the contact positions of the wire electrode 14 can be measured by relatively moving the wire electrode 14 with respect to the first contact detection jig $20_n$ and the second contact detection jig $20_{n+1}$ of the table 13.

Figure 19:
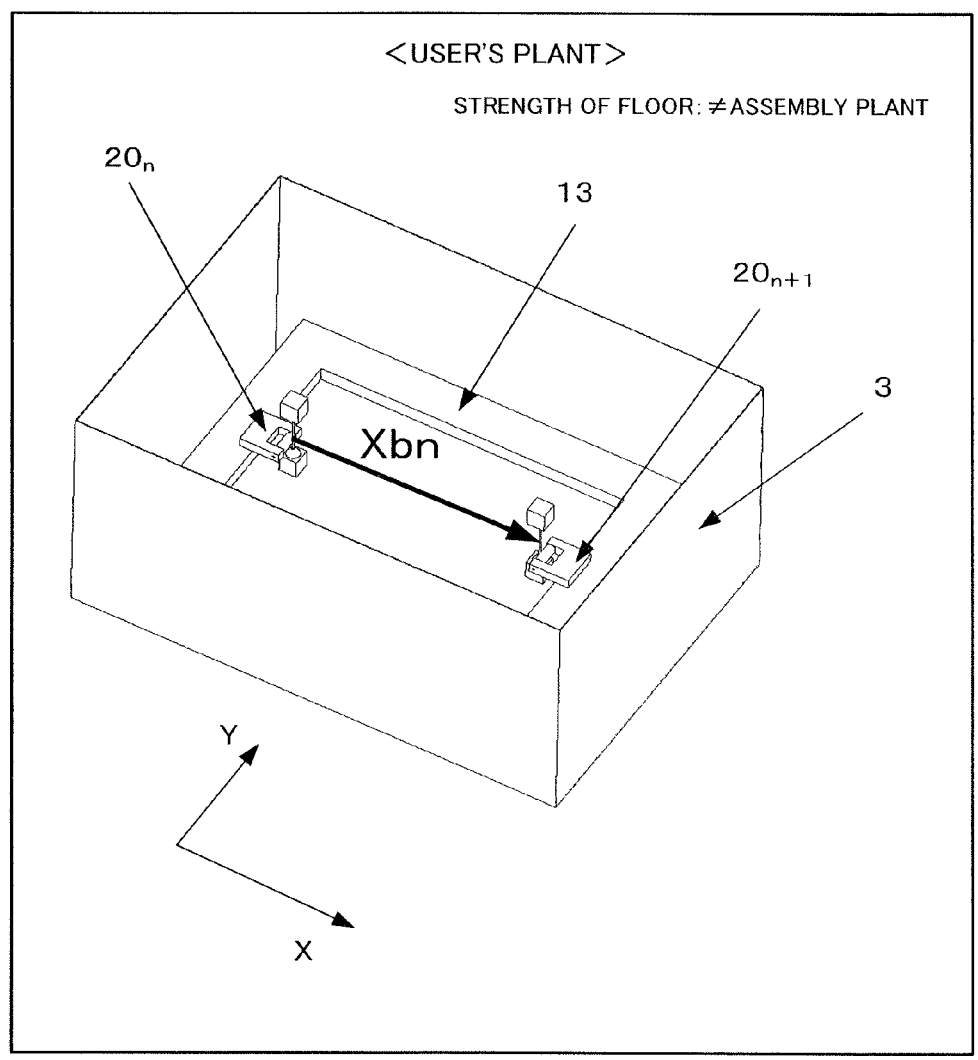
FIG. 19 is a figure illustrating how an inter-jig distance is measured in a user's plant.

[2] After the wire electric discharge machine is installed in the user's factory (user's plant) of which strength of the floor is different from that of the assembly plant, the same measurement as that performed in the assembly plant in the above [1] is executed, and the coordinates $b_n$, $b_{n+1}$ at the contact positions of the contact detection jigs $20_n$, $20_{n+1}$ and the wire electrode 14 are measured and stored, and a distance between the contact detection jigs $Xb_n = b_{n+1} - b_n$ is obtained (see FIG. 19). Coordinates $b_n$, $b_{n+1}$ at the contact position can be measured by relatively moving the wire electrode 14 with respect to the contact detection jigs $20_n$, $20_{n+1}$ fixed to the table 13.

[3] The inclination $\Theta n$ of the amount of compensation is obtained from the equation, $\Theta n = (Xb_n - Xa_n)/Xb_n$.

[4] When the distance from the contact position (coordinate $b_n$) of the wire electrode 14 is denoted as $(Xb_n)'$, change in positioning accuracy caused by the difference of the strength of the floor where the wire electric discharge machine is installed and the difference of the levelling can be compensated by the equation, $(Xb_n)' - \Theta_n * (Xb_n)'$. Making compensation according to the distance from the position of the coordinate $b_n$ means making error compensation based on the contact position coordinate system of which origin point is the position of the coordinate $b_n$.

Figure 20:
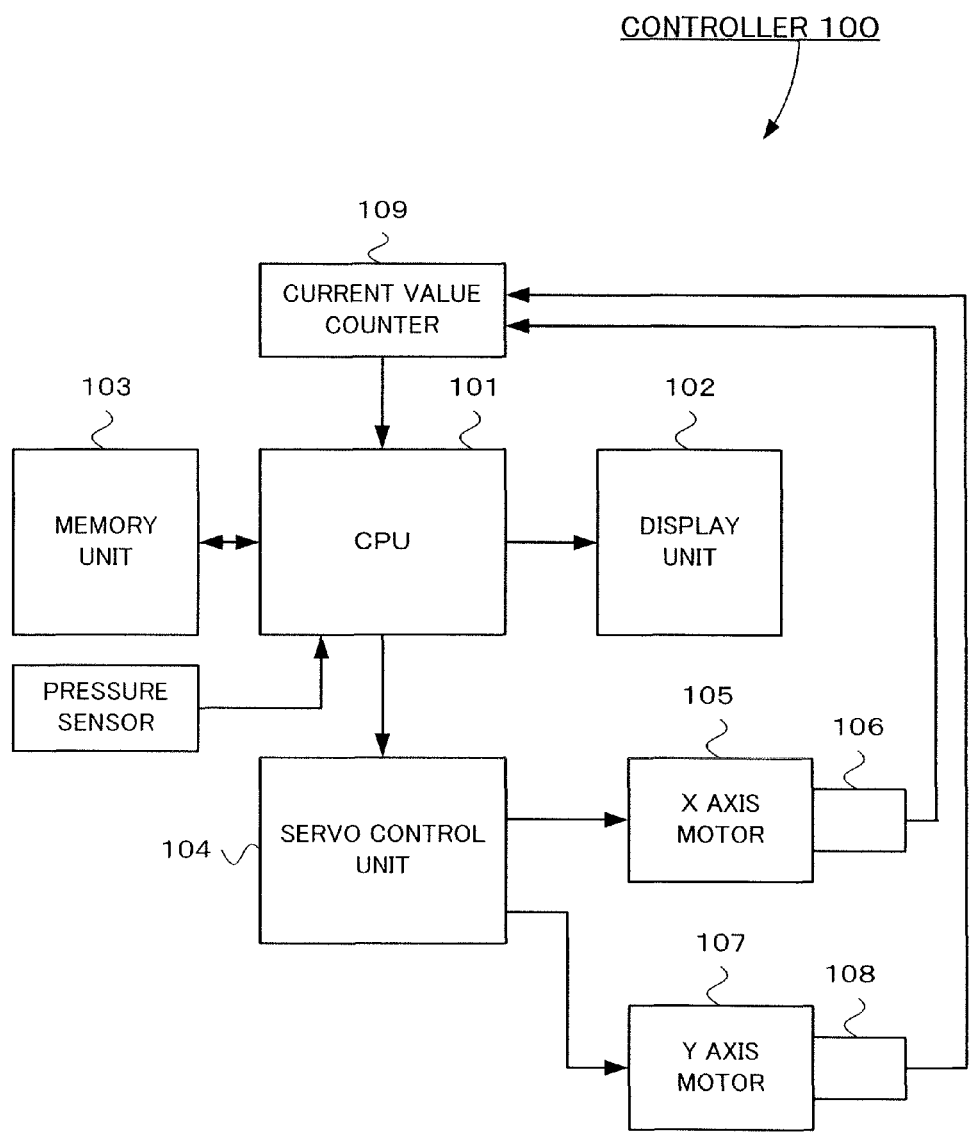
FIG. 20 is block diagram illustrating overview of processing in a controller.
Figure 22:
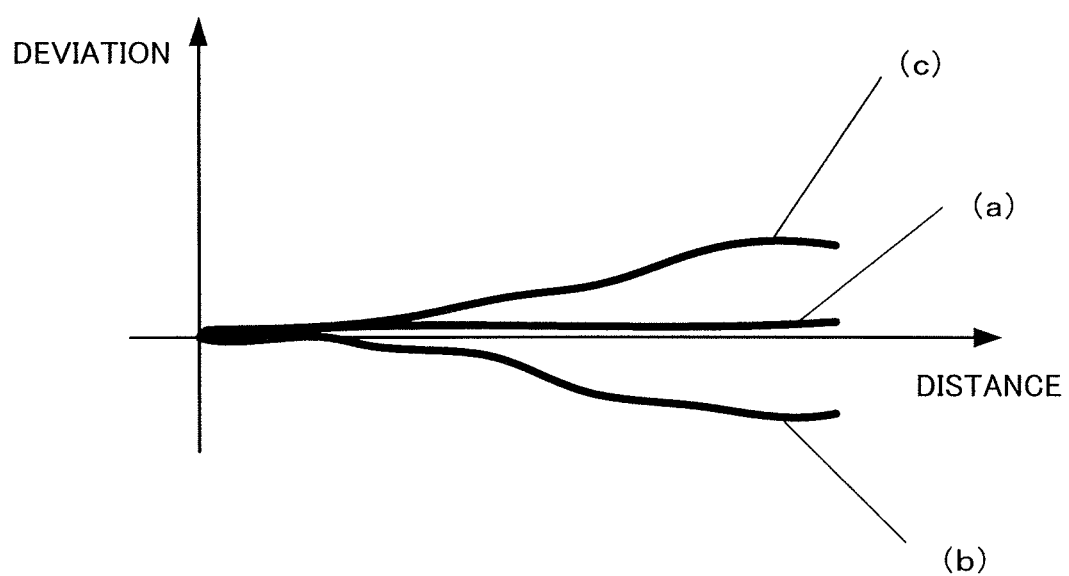
FIG. 22 is a figure illustrating pitch errors of FIGS. 21A, 21B, and 21C.

FIG. 20 is a block diagram illustrating overview of processing in a controller. This will be explained with reference to FIGS. 1 and 2. The pressure sensor 6 is a sensor for measuring the liquid level of the machining liquid 16 in the machining tank 3, and a CPU 101 receives a detection signal output from the pressure sensor 6. Reference numeral 109 denotes a current value counter, which receives position detection signals from position detectors 106, 108 respectively provided in an X axis motor 105 and a Y axis motor 107, and transmits current position information of the table 13 to the CPU 101. Reference numeral 103 denotes a memory unit for storing compensation information according to the present invention. The reference distance and the actual distance according to the error compensation of the present invention are measured in advance using the above method, and are stored to a memory unit 103 as reference distance information and actual distance information. Reference numeral 104 denotes a servo control unit, which transmits an output corresponding to a move instruction output from the CPU 101 to each of the axis motors 105, 107, so that the table 13 or upper and lower guides 1, 2 are driven. The CPU 101 calculates the difference between the reference distance information and the actual distance information, and performs compensation calculation for compensating the instruction according to the distance from the contact position coordinate so as to cancel the difference during the actual machining, and outputs it to the servo control unit 104.

The invention claimed is:

1. A wire electric discharge machine having a machining tank for storing a machining liquid, wherein an object to be machined is placed on a table provided in the machining tank, and the object is machined by relatively moving a wire electrode with respect to the table on the basis of an instruction output from a controller, the wire electric discharge machine comprising:

a combination of contact detection jigs including a first contact detection jig having a first contact detection unit and a second contact detection jig having a second contact detection unit, wherein the first and second contact detection jigs are arranged at a predetermined distance from each other on a same axial line on the table such that the first and second contact detection units face each other;

a contact detection unit for detecting contact between the wire electrode and the first and second contact detection jigs;

a coordinate value memory unit for respectively storing coordinate values of axes moved when the wire electrode comes into contact with the first and second contact detection jigs;

a reference distance memory unit for causing the wire electrode to come into contact with the first and second contact detection jigs under a first state in which a desired positioning accuracy can be obtained, and obtaining and storing, as a reference distance, a distance between the first contact detection jig and the second contact detection jig from the coordinate values when the wire electrode comes into contact with the first and second contact detection jigs, which are stored in the coordinate value memory unit;

an actual distance memory unit for causing the wire electrode to come into contact with the first and second contact detection jigs under a second state which is different from the first state, and storing, as an actual distance, a distance between the first contact detection jig and the second contact detection jig from the coordinate values when the wire electrode comes into contact with the first and second contact detection jigs, which are stored in the coordinate value memory unit; and a compensation unit for calculating a difference between the reference distance stored in the reference distance memory unit and the actual distance stored in the actual distance memory unit, and compensating the instruction according to the distance from the contact position coordinate so as to cancel the difference during actual machining.

2. The wire electric discharge machine according to claim 1, wherein in the first state, the wire electric discharge machine is installed on a first floor with a first rigidity at which a desired positioning accuracy is obtainable, and in the second state, the wire electric discharge machine is installed on a second floor with a second rigidity different from the first rigidity.

3. The wire electric discharge machine according to claim 1, wherein the combination of the contact detection jigs is a plurality of contact detection jigs arranged in parallel.

4. The wire electric discharge machine according to claim 1, wherein the contact detection jig is made by making a through-hole in a plate-like member, and a coordinate of a center of the hole is obtained by bringing the wire electrode into contact with at least three locations on an inner surface of the through-hole, and the coordinate value is adopted as a coordinate value of an axis moved when the contact detection jig and the wire electrode come into contact with each other.

5. The wire electric discharge machine according to claim 1, wherein the pair of contact detection jigs is constituted as a single contact detection jig having at least two contact units with the wire electrode.

6. The wire electric discharge machine according to claim 1, wherein in the first state, the object is not placed on the table, and the machining liquid is not accumulated in the machining tank, and in the second state, the object is placed on the table, and the machining liquid is accumulated to a predetermined machining liquid height in the machining tank.

7. The wire electric discharge machine according to claim 6, wherein the second state is achieved by accumulating the machining liquid equivalent to a weight of the object placed on the table, in addition to the machining liquid height during the actual machining.

8. A wire electric discharge machine having a machining tank for storing a machining liquid, wherein an object to be machined is placed on a table provided in the machining tank, and the object is machined by relatively moving a wire electrode with respect to the table on the basis of an instruction output from a controller, the wire electric discharge machine comprising:

a combination of contact detection jigs including a first contact detection jig having a first contact detection unit and a second contact detection jig having a second contact detection unit, wherein the first and second contact detection jigs are arranged at a predetermined distance from each other on axial lines different from each other on the table such that the first and second contact detection units face each other;

a contact detection unit for detecting contact between the wire electrode and the first and second contact detection jigs;

a coordinate value memory unit for respectively storing coordinate values of axes moved when the wire electrode comes into contact with the first and second contact detection jigs;

a reference distance memory unit for causing the wire electrode to come into contact with the first and second contact detection jigs under a first state in which a desired positioning accuracy can be obtained, and obtaining and storing, as a reference distance, a distance in each moving axial direction between the first contact detection jig and the second contact detection jig from the coordinate values when the wire electrode comes into contact with the first and second contact detection jigs, which are stored in the coordinate value memory unit;

an actual distance memory unit for causing the wire electrode to come into contact with the first and second contact detection jigs under a second state which is different from the first state, and storing, as an actual distance, a distance in each moving axial direction between the first contact detection jig and the second contact detection jig from the coordinate values when the wire electrode comes into contact with the first and second contact detection jigs, which are stored in the coordinate value memory unit; and a compensation unit for calculating a difference between the reference distance stored in the reference distance memory unit and the actual distance stored in the actual distance memory unit, and compensating the instruction according to the distance from the contact position coordinate so as to cancel the difference during actual machining.

* * * * *